Aug. 27, 1963     M. D. JENNINGS     3,101,789
DISK PLOW ATTACHMENT
Filed Jan. 2, 1962
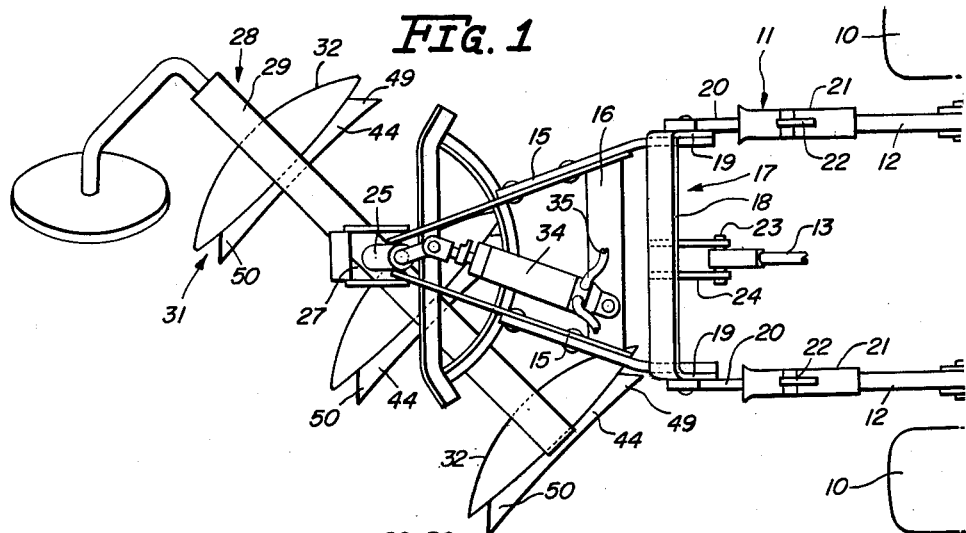
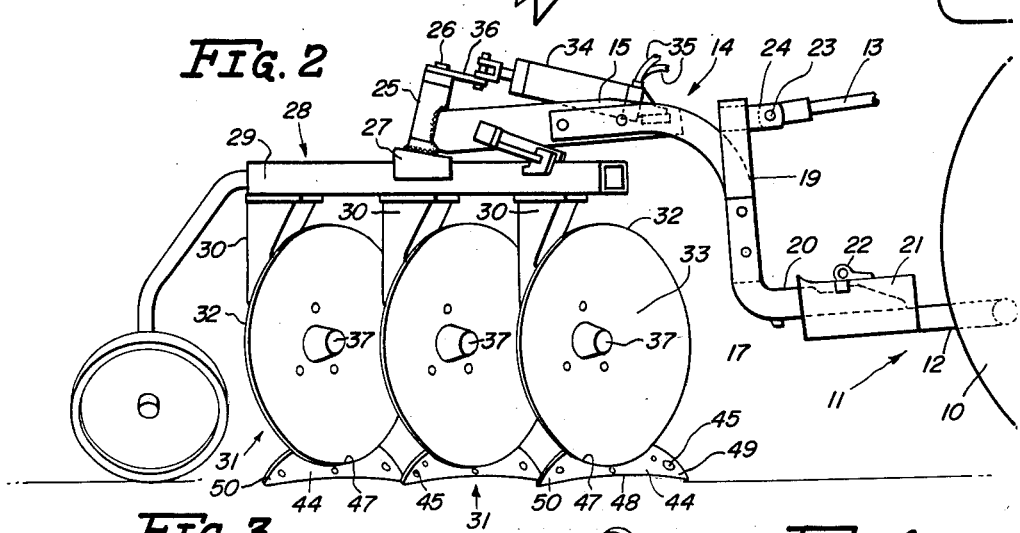
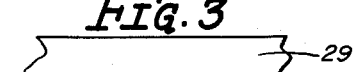
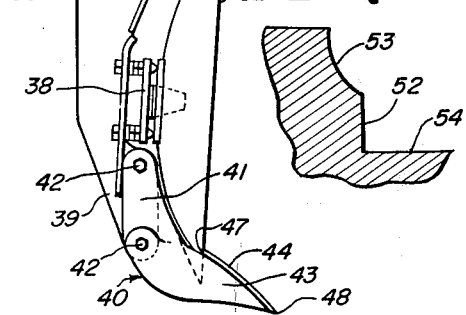
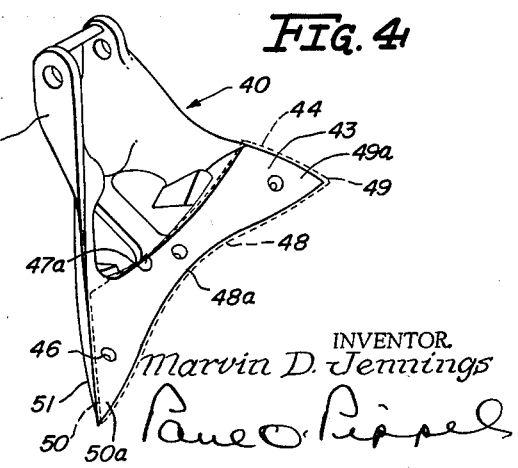
INVENTOR.
Marvin D. Jennings
Atty.

United States Patent Office 3,101,789
Patented Aug. 27, 1963

3,101,789
DISK PLOW ATTACHMENT
Marvin D. Jennings, Naperville, Ill., assignor to International Harvester Company, Chicago, Ill., a corporation of New Jersey
Filed Jan. 2, 1962, Ser. No. 163,747
5 Claims. (Cl. 172—219)

This invention relates to agricultural implements and particularly to plows. More specifically, the invention concerns improvements in two-way or reversible disk plows.

An object of the invention is the provision of novel means for leveling a two-way disk plow or the like.

Another object of the invention is the provision of a novel two-way or reversible disk plow of the type mounted upon a tractor having hitch apparatus to which the implement is connected for movement in a vertical plane between operating and transport positions, wherein means are provided to maintain the plow level in both operating positions thereof.

Disk plows do not normally penetrate as deeply or hold their depth as well as the conventional moldboard plow, and it is an important object of this invention to provide, for a disk plow, an auxiliary attachment designed to cause the disk to penetrate deeper and to perform a better operation.

Another object of the invention is the provision of an improved reversible disk plow having an allochiral auxiliary tool attachment adapted to penetrate soil below and somewhat in advance of the disk in both right and left-hand plowing positions, and to assure the desired depth of the penetration of the disk.

Other objects and advantages of the invention will become clear from the following detailed description when read in conjunction with the accompanying drawings wherein:

FIGURE 1 is a plan view of the rear end of a tractor having a power lifted hitch structure thereon and having secured thereto a two-way disk plow incorporating the features of this invention;

FIGURE 2 is a view in side elevation of the structure shown in FIGURE 1;

FIGURE 3 is an enlarged detail showing in side elevation one of the disking tools of this invention;

FIGURE 4 is a perspective view of the supporting frog for the earth-penetrating blade mounted below the disk, and;

FIGURE 5 is a diagrammatic cross-section of a furrow formed by the novel earthworking tool of this invention.

Referring to the drawings, the numeral 10 designates the laterally spaced rear drive wheels of a conventional tractor having a hitch structure 11 of the conventional tractor having a hitch structure 11 of the three point type, which is well known in the art, pivotally connected thereto for vertical movement relative to the tractor, such vertical movement being accomplished by means, not shown, deriving power from the tractor.

Hitch structure 11 includes a pair of laterally spaced lower links 12 and a centrally disposed upper link 13.

The implement of this invention is a reversible or two-way disk plow which comprises a supporting frame 14 including rearwardly converging beams 15 braced by a cross bar 16 and the forward, laterally spaced ends of which are secured to a yoke 17 including a transverse portion 18, and depending legs 19, to which are secured forwardly projecting shaft members 20 adapted for sliding reception in socket members 21 affixed to the rear ends of lower links 12 and held therein against longitudinal displacement by latch means 22. Upper link 13 is connected by a pivot pin 23 to a pair of lugs 24 secured to the transverse portion 18 of yoke 17.

A bearing 25 is secured to the rear ends of beams 15 and has received therein a pivot pin 26 affixed to a bracket 27 mounted on a disk carrier 28. Disk carrier 28 includes a horizontal beam 29, rectangular in section, extending diagonally of the direction of travel of the tractor and implement and having secured to and depending therefrom at longitudinally spaced locations a plurality of standards 30 upon which are mounted earthworking tools, each of which is designated in its entirety by the numeral 31.

The standards 30 and earthworking tool units 31 are substantial duplicates and a description of one will suffice for all. Each unit 31 comprises a plow disk 32 having a concave face 33 generally at right angles to the beam 29 and facing diagonally of the direction of travel, the right-hand plowing position being shown in the drawings. In the drawings it will be observed that each disk 32 has a forward or leading edge which engages the ground first and forms a furrow and a rearward or trailing edge over which the displaced dirt passes as the furrow is turned to the right of the direction of travel. When the direction of travel is reversed at the end of a field, the disk carrier 28 is shifted laterally about the axis of the pivot member 26 to the opposite diagonal so that the trailing edges of the disks become the leading edges and dirt from the furrows is thrown to the left.

The mechanism by which the lateral swinging or shifting of the disk carrier 28 is accomplished forms per se, no part of this invention, but it may be understood to include a hydraulic cylinder 34 receiving fluid under pressure through hose lines 35 from a source, not shown, on the tractor. The cylinder 34 is anchored to crossbrace 16 and is connected to an arm 36 secured to the upper end of pivot member 26.

Disk 32 is affixed to a stub axle 37 rotatably mounted upon a plate 38 secured to standard 30 medially of its ends.

Standard 30 has an extension 39 at its lower end to which is secured a blade-supporting allochiral frog 40 having an upper attaching section 41 the forward portion of which conforms to the convex rear surface of the lower portion of disk 32 and is secured to the extension 39 of standard 30 by bolts 42.

The power portion 43 of the frog projects below and forwardly of the earth-engaging face 33 of the disk and forms an attaching section for an earth-penetrating blade 44.

Blade 44 is contoured to form generally a continuation of the lower concave face of disk 32 and is secured to the lower blade attaching section 43 of the frog by flatheaded bolts 45 receivable in threaded openings 46 in the frog. The blade has a relatively short upper edge 47 adjacent the plane of and contoured to fit the periphery of the associated disk. Blade 44 has a relatively long lower earth-penetrating edge 48 conforming to the curvature of the lower edge 48a of the frog, the upper edge 47 of the blade conforming to the contour of the upper edge 47a of the blade attaching section 43 of the frog.

The lower edge 48 of the blade terminates in plow points 49 and 50, triangularly shaped and conforming to the shape of corresponding points 49a and 50a of the frog.

In the right hand plowing position shown in the drawings, point 49 of the blade is the forwardmost or leading point while the opposite point 50 is the rearwardmost or trailing point of the blade, it being understood that upon lateral swinging of the tool carrier 28 to dispose it in the left-hand plowing position, points 49 and 50 alternate and point 50 becomes the leading point of the blade 44.

The side 51 of the frog adjacent point 50 of the blade constitutes a landside which shapes the vertical portion 52 of the furrow indicated in FIGURE 5, the upper, curved section 53 of the furrow being formed by the disk. The bottom surface 54 of the furrow is flat like the furrow formed by a moldboard type of plow.

By providing the auxiliary frog 40 and the blade 44 below the disk 32, the penetration of the latter in the ground is greatly improved while minimizing the effect of the frictional resistance of the soil, the alternately operating points 49 and 50 of the blade serving in both right and left-hand plowing positions, not only to increase the depth at which the disk plow can operate, but also to hold the disks to their working depth and improves their stability in the ground.

The construction and operation of the improved reversible disk plow of this invention should be clearly understood from the foregoing description. It should likewise be understood that the invention has been described in its preferred embodiment only and that modifications may be made therein without departing from the spirt of the invention or the scope of the appended claims.

What is claimed is:

1. In a reversible disk plow having a supporting frame, a disk carrier mounted on the frame on a generally vertical pivot axis for alternate swinging laterally about said axis relative to the supporting frame, an earth-engaging disk rotatably mounted on the carrier for lateral swinging therewith to face opposite diagonals in positions for right and left-hand plowing, and an auxiliary allochiral earth-engaging tool mounted on the carrier having an earth-engaging face disposed below said disk and forming generally a continuation of the lower surface thereof, said auxiliary tool having a relatively short upper edge and a relatively long lower edge disposed diagonally of the direction of travel and terminating in forward and rearward right and left-hand earth penetrating points, said points being alternately disposable forwardly, upon lateral swinging of the carrier and disk for right and left-hand plowing to open a path in the soil below the disk.

2. The invention set forth in claim 1, wherein power operated means is anchored to the supporting frame and operatively connected to the disk carrier for laterally shifting the carrier to opposite diagonals for right and left-hand plowing.

3. In a reversible disk plow having a supporting frame, a disk carrier mounted on the frame on a generally vertical axis for alternate swinging laterally about said axis relative to the supporting frame and having a standard affixed to and depending therefrom, an earth-engaging disk rotatably mounted on the standard for lateral swinging therewith to face opposite diagonals in positions for right and left-hand plowing, a supporting frog secured to the lower end of the standard rearwardly of the disk, said frog conforming generally to the contour of the disk and having an allochiral blade-attaching portion projecting below and forwardly of the earth-engaging face of the disk, and an earth-penetrating blade conforming to the shape of and secured to said blade-attaching portion of the frog.

4. The invention set forth in claim 3, wherein said blade has a lower edge terminating at each end in earth-penetrating points each of which is alternately disposable forwardly of the other when the disk carrier is shifted to opposite diagonals for right and left-hand plowing and wherein said frog is provided with a landside face adjacent each point adapted to form a vertical furrow wall section as the plow is propelled through the ground.

5. The invention set forth in claim 4, wherein the disk is so disposed relative to the earth-penetrating blade that it penetrates the furrow wall above said vertical wall section and laterally thereof to form an arcuate path extending landwardly beyond said vertical section.

References Cited in the file of this patent

UNITED STATES PATENTS

| | | |
|---|---|---|
| 114,002 | Godfrey | Apr. 25, 1871 |
| 623,673 | Kavanagh | Apr. 25, 1899 |
| 735,506 | Hatcher | Aug. 4, 1903 |
| 793,715 | Deere | July 4, 1905 |
| 860,894 | Belk | July 23, 1907 |
| 1,271,373 | Rusk | July 2, 1918 |
| 1,521,895 | Logan | July 6, 1925 |
| 2,874,788 | Altgelt | Feb. 24, 1959 |